United States Patent [19]

Denz

[11] Patent Number: 5,463,556
[45] Date of Patent: Oct. 31, 1995

[54] PROCESS AND DEVICE FOR CONTROL OF AN AUTOLEVELING DRAW FRAME

[75] Inventor: Peter Denz, Ingolstadt, Germany

[73] Assignee: Rieter Ingolstadt Spinnereimaschinenbau AG, Ingolstadt, Germany

[21] Appl. No.: 296,085

[22] Filed: Aug. 25, 1994

Related U.S. Application Data

[63] Continuation of Ser. No. 74,111, Jun. 8, 1993, abandoned.

[30] Foreign Application Priority Data

Jun. 17, 1992 [DE] Germany ................. 42 19 777.5

[51] Int. Cl.⁶ ......................................... D01H 5/32
[52] U.S. Cl. ..................... 364/470; 19/236; 19/239; 73/862.625; 66/164
[58] Field of Search ................ 19/240, 236, 239, 19/292, 65 A, 300; 73/862.625; 250/548, 559, 560; 364/470, 474.12, 474.34, 474.35, 474.37, 554; 66/164, 166, 232

[56] References Cited

U.S. PATENT DOCUMENTS

| | | |
|---|---|---|
| 110,556 | 12/1870 | Draper . |
| 216,630 | 6/1879 | Reilley . |
| 278,488 | 5/1883 | Ayers . |
| 284,585 | 9/1883 | Whitehead . |
| 352,701 | 11/1886 | Matteson . |
| 387,701 | 8/1888 | Upton . |
| 389,695 | 9/1888 | Evans . |

(List continued on next page.)

FOREIGN PATENT DOCUMENTS

| | | |
|---|---|---|
| 1195177 | 11/1959 | France . |
| 1237428 | 6/1960 | France . |
| 720200 | 4/1942 | Germany . |
| 1097328 | 1/1961 | Germany . |
| 1287484 | 9/1969 | Germany . |
| 1510460 | 4/1971 | Germany . |
| 2331217 | 1/1975 | Germany . |
| 401758 | 2/1974 | U.S.S.R. . |
| 779197 | 7/1957 | United Kingdom . |
| 855949 | 12/1960 | United Kingdom . |
| 891321 | 3/1962 | United Kingdom . |
| 979346 | 1/1965 | United Kingdom . |
| 1135752 | 12/1968 | United Kingdom . |
| 1436029 | 5/1976 | United Kingdom . |
| 1443258 | 7/1976 | United Kingdom . |

OTHER PUBLICATIONS

"Automatic Eveners: What They Do, How They Work" by Dr. Hugh M. Brown, Textile World, Feb., 1966.

"Simulation of a Textile Machine Process Control System", Atomic Weapons Research Establishment Awre Report No. 0–71/66, By K. G. Beauchamp, Oct., 1966.

"Draw Frame With Servo Controlled Draft" Saco–Lowell Shops, Boston, U.S.A.

" A Survey of Autolevelling at the Drawframe" By David J. Goetzinger, Dec. 1, 1976.

(List continued on next page.)

*Primary Examiner*—Ellis B. Ramirez
*Assistant Examiner*—Thomas Peeso
*Attorney, Agent, or Firm*—Dority & Manning

[57] ABSTRACT

The invention relates to an autolevelling draw-frame of the textile industry in which the drafting of the fiber sliver can be modified in a controlled and/or autolevelled manner. It is the object of the invention to analyze electrical signals or measured values of a draw-frame so that correction may be made on basis of these analyses. This object is attained in that additional, time-related signal analyses are conducted independently of autolevelling. They make it possible to recognize corrigible deviations within the analyzed signals as well as the establishment of appropriate correction values. If deviations exceed a tolerance, a determination is made in combination with the knowledge memory of a computer whether the deviation is due to a disturbance in the machine or whether the deviation can be explained as a logical consequence.

15 Claims, 3 Drawing Sheets

U.S. PATENT DOCUMENTS

| | | |
|---|---|---|
| 392,172 | 10/1888 | Wilkins . |
| 447,200 | 2/1891 | Peirce . |
| 449,477 | 3/1891 | Hildreth . |
| 466,410 | 1/1892 | Hadfield . |
| 565,084 | 8/1896 | Mathewson . |
| 655,934 | 8/1900 | Mathewson . |
| 690,596 | 1/1902 | Mathewson . |
| 786,242 | 3/1905 | Westcott et al. . |
| 887,281 | 5/1908 | Smith . |
| 1,111,290 | 9/1914 | Birch et al. . |
| 1,132,316 | 3/1915 | Eves . |
| 2,141,003 | 3/1936 | King et al. . |
| 2,407,100 | 9/1946 | Richardson . |
| 2,681,475 | 6/1954 | Raper . |
| 2,746,093 | 5/1956 | Raper . |
| 2,810,936 | 10/1957 | Altenburger . |
| 2,890,494 | 6/1959 | Raper . |
| 2,891,287 | 6/1959 | Raper . |
| 2,930,084 | 3/1960 | Sanborn et al. . |
| 2,950,508 | 8/1960 | Locher . |
| 2,964,803 | 12/1960 | Robinson . |
| 2,981,986 | 5/1961 | Neil . |
| 3,016,460 | 1/1962 | Andresen . |
| 3,099,048 | 7/1963 | Locher . |
| 3,113,350 | 12/1963 | Selby . |
| 3,244,863 | 4/1966 | Paterson . |
| 3,246,916 | 8/1966 | Owen . |
| 3,314,114 | 4/1967 | Wyatt . |
| 3,440,690 | 4/1969 | Greenwood et al. . |
| 3,557,615 | 1/1971 | Seymour, Jr. et al. . |
| 3,624,369 | 11/1971 | Kip, Jr. . |
| 3,703,023 | 11/1972 | Krauss et al. . |
| 3,768,122 | 10/1973 | Rauch . |
| 3,795,851 | 3/1974 | Gage et al. . |
| 3,822,590 | 7/1974 | Tharpe et al. . |
| 3,827,106 | 8/1974 | Varga . |
| 3,862,473 | 1/1975 | Felix et al. . |
| 3,869,759 | 3/1975 | Savageau et al. . |
| 3,885,232 | 5/1975 | Goto . |
| 3,925,850 | 12/1975 | Lytton . |
| 3,938,223 | 2/1976 | Grice . |
| 3,941,986 | 3/1976 | Santucci . |
| 4,030,082 | 6/1977 | Goto . |
| 4,030,635 | 6/1977 | Hablutzel et al. . |
| 4,051,722 | 10/1977 | Feller . |
| 4,099,297 | 7/1978 | Hasegawa et al. . |
| 4,137,487 | 1/1979 | Niestroj et al. . |
| 4,163,927 | 8/1979 | Grice, Jr. . |
| 4,369,550 | 1/1983 | Meile ........................................ 19/240 |
| 4,653,153 | 3/1987 | Felix et al. ................................ 19/240 |
| 4,700,538 | 10/1987 | Varga et al. ................................ 57/90 |
| 4,974,296 | 12/1990 | Vidler . |
| 5,018,248 | 5/1991 | Haworth et al. ........................... 19/240 |
| 5,023,977 | 6/1991 | Lang ...................................... 19/115 R |
| 5,067,202 | 11/1991 | Demuth ................................... 19/65 A |
| 5,134,755 | 8/1992 | Jornot et al. . |

OTHER PUBLICATIONS

"Design, Construction, and Performance of Saco–Lowell/ Uster Versa–Matic ADC Draw Frame", by Paul B. West, Jun. 1, 1960.

"Saco–Lowell Uster Versamatic Automatic Draw Frame Draft Control".

"Platt Group Bulletin" vol. 11, No. 3, Autolevelling at the Drawframe.

New Perspectives in Fibre Sliver Levelling, by: Dr. Ing. B. Wulfhorst and Dipl. Ing. W. Friebel, International Textile Bulletin, Jan., 1986.

Electronics in Textile Machines–Carding Machine Control, Industrial Electronics, May, 1965.

PROCESS AND DEVICE FOR CONTROL OF AN AUTOLEVELING DRAW FRAME

This is a continuation of application U.S. Pat. No. 08/074,111 filed Jun. 8, 1993, which was abandoned upon the filing hereof.

BACKGROUND OF THE INVENTION

The invention relates to an autolevelling draw-frame of the textile industry in which drafting of the fiber sliver can be modified in a controlled and/or autolevelled manner. The concept of autolevelling comprises, in this case, control and regulation of drafting. Environmental influences and internal machine influences in an autolevelling draw-frame lead to influences on a plurality of signals and measured values. Recognizing errors in signals, compensating for same and transmitting information to the autolevelling draw-frame to locate errors serves to improve the product quality and to increase the availability of the autolevelling draw-frame.

The known algorithms for autolevelling are created for very specialized tasks. This is, however, the critical situation with conventional autolevelling. The algorithm is tied to fixed precisely defined machine processes and influence magnitudes, i.e. autolevelling is determined by specific computation programs. One disadvantage of this restriction is that environmental factors and those which are attributable to the machine nevertheless influence autolevelling, since they cannot be described sufficiently in the algorithm and therefore cannot sufficiently be compensated for (see EP 412 448).

The fact that such errors can occur in the measured-value signal of the measuring device is significant. A measuring device is normally a mechanical scanning roller. The measuring device can however be based on some other measuring principle. This would have as a consequence that the influence factors described below would take effect to a greater or lesser degree.

The temperature of the scanning rollers supplying a measured-value signal of the thickness of the fiber sliver, for instance, is an influence factor based on the environment. After long stoppage of the draw-frame the scanning rollers have assumed environmental temperature. After the start-up of the draw-frame a period of time which is not defined precisely elapses until the scanning rollers have reached operating temperature (dependant on friction against the fiber sliver), i.e. the diameters of the scanning rollers change in an unknown manner so that the establishment of the measured-value signal is subject to error. This change in the influence parameter temperature on the scanning rollers, until operating temperature is reached, cannot be incorporated precisely into an algorithm and therefore this influence upon the scanning rollers cannot be corrected precisely for autolevelling.

Autolevelling processes have not been able in the past to eliminate these disadvantages effectively.

A factor of a different type which influences the establishment of the measured-value signal is the stoppage time of the fiber sliver until continued processing on the autolevelling draw-frame resumes. During that time, the compressibility of the fiber sliver will change, e.g. due to reoccurrence of rippling, change in humidity, etc., and this leads to a deviation from the measured thickness of the fiber sliver. This situation plays a significant role in the conventional autolevelling processes.

It is a further disadvantage that known autolevelling systems do not locate the cause of a disturbance. For example, when a draw-frame shuts off because the sliver number has been exceeded, it is not possible to know whether medium-wave or long-wave sliver errors were the cause of it. Similarly, disturbances in the transmission between main motor and the pair of main drafting rollers for instance, are not recognized.

OBJECTS AND SUMMARY OF THE INVENTION

It is a principal object of the instant invention to analyze electrical signals or measured values of a draw-frame so that corrections may be made on the basis of the analysis, disturbances may be signalled or special maintenance may be called up. Additional objects and advantages of the invention will be set forth in part in the description which follows, and in part will be obvious from the description, or may be learned by practice of the invention.

The thickness of the fiber sliver and the speed of the fiber sliver before and after the draw-frame are determined by means of measuring devices. These measured values are transmitted parallel to the autolevelling to different signal analyses working parallel to each other. Additional signal analyses as function of time are furthermore conducted on each detected measured-value signal to determine fiber sliver thickness and fiber sliver speed.

The signal analyses are not only conducted on signals originating in the measuring of the fiber sliver. In addition, other internal machine signals are also detected and transmitted to additional, time-related signal analyses. The signal analyses are conducted continuously, but are interrogated only when a search is triggered. The types of time-related signal analyses are selected according to expert knowledge. The time-related signal analyses are conducted by means of a computer. They are to make it possible to recognize corrigible deviations within the analyzed signals as well as the constitution of appropriate correction values.

Applied expert knowledge determines which of the signal analyses are to be used. It is also possible to use analysis processes to recognize the types of raw materials, the quality of raw materials, operating conditions and machine settings.

The result (signal magnitude) of each additional, time-related signal analysis is assigned a memory location. The last-formed value is always entered at this memory location and the previous value is overwritten in the process, but only when a comparison between a previous value in time and a new, updated value has shown agreement within a predetermined tolerance.

A deviation is, however, also possible. If this is the case, the acceptance of the first compared, newer signal is prevented for the time being. Based on this difference and on its type (positive, negative, spectral) a search (this is the equivalent of an interrogation) of the contents of relevant analysis memories is conducted, again while taking into account expert knowledge (i.e. in interaction with the knowledge memory of the computer).

In interaction with the knowledge memory of the computer, a determination is made on whether the difference results from a malfunction in the machine or whether the difference can be explained in size and preliminary signs, i.e. whether it is a logical consequence of the search.

Concrete disturbances have concrete signal deviations as a consequence. Thus, signal deviations can in turn be attributed to concrete disturbances, which is a logical consequence. If a corrigible deviation is recognized in a signal, the required correction value is immediately calculated by evaluating the deviation and is added to the signal. The present value is received into memory and the previous value is overwritten.

As the result of the search, a deviation can also be recognized as being a disturbance within the machine. In that case the machine is stopped and the result of the search is utilized as an indication to locate the error.

As a result of the search, a deviation can also be recognized as being the logical consequence of wanted, manual interventions. In that case the present analysis values are held back until they are received into memory without any further correction.

It is an advantage for the process to function parallel to and independently from the existing autolevelling function. It thus functions free from autolevelling influences. The process is advantageously able to recognize the errors due to internal machine influences and environmental influences upon autolevelling and to compensate for them by means of influence-free correction values to be established.

The expanded possibility of setting up logical consequences when analyzing signals offers the advantage that the causes of errors can be found. This is a new quality as compared to known processes for the correction of autolevelling. It furthermore recognizes unfavorable machine settings and overloads. It gives information on required, special maintenance tasks and recognizes suddenly occurring deteriorations of the material. The process is furthermore able to report manual interventions and operational data in protocols.

An embodiment of the invention is shown in the drawing and described in greater detail below.

DETAILED DESCRIPTION OF THE PREFERRED EMBODIMENTS

Figure 1:
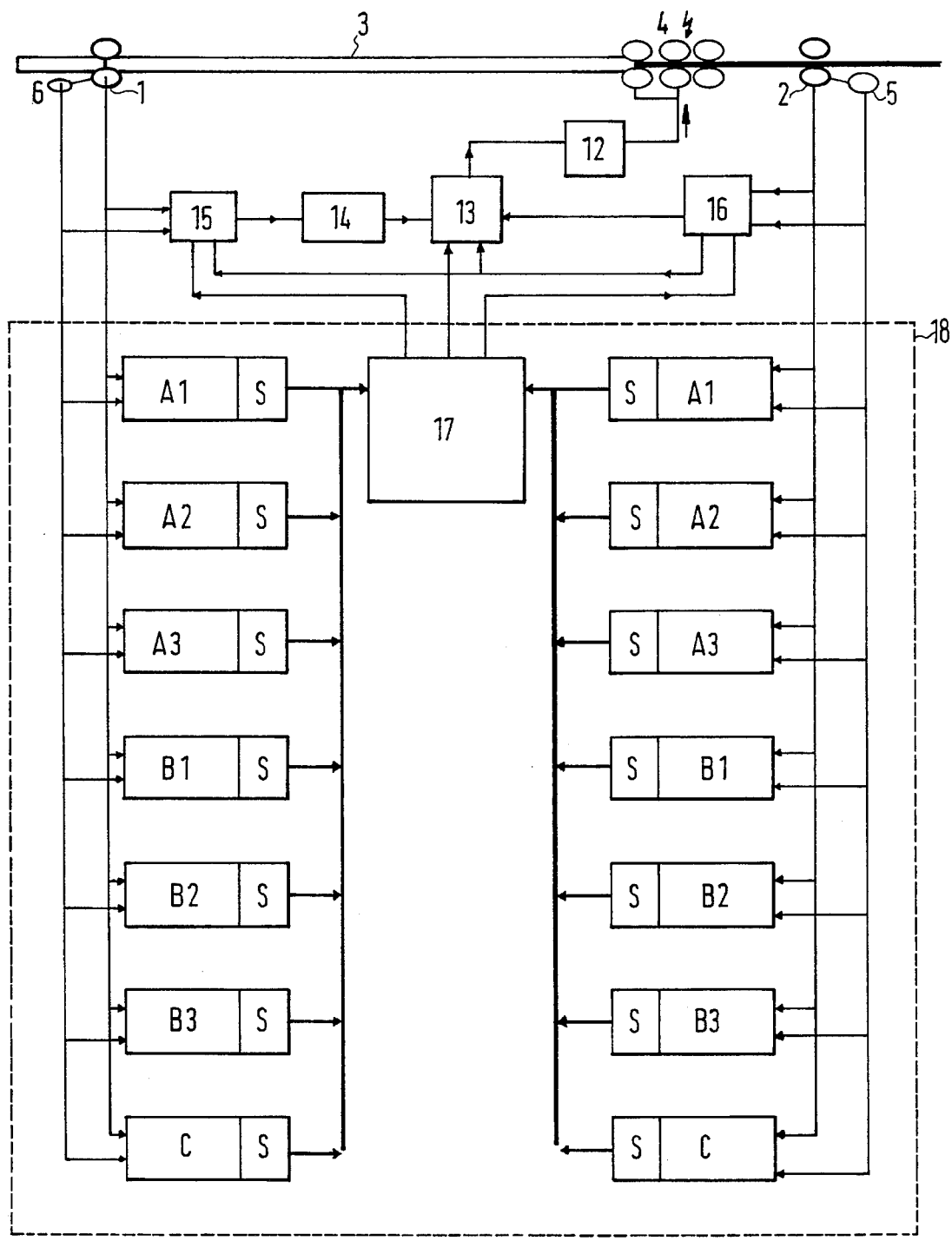
FIG. 1 is a diagrammatic functional view of integration of the signal analyses in measuring fiber slivers, in an existing autolevelling system.

Reference will now be made in detail to the presently preferred embodiments of the invention. Each example is provided by way of explanation of the invention, not limitation of the invention. It will be apparent to those skilled in the art that various modifications and variations can be made in the present invention without departing from the scope or spirit of the invention. The numbering of components in the drawings is consistent throughout the application, with the same components having the same number in each of the drawings.

The autolevelling function may be carried out through control of drafting, autolevelling of drafting, or a combination of both. In the example of FIG. 1, autolevelling which changes drafting through control is shown. The autolevelling function known from the state of the art is shown in FIG. 1 by that part which is located outside the signal analyses 18. For this purpose, a measuring device 1 is installed before the draw-frame 4. This measuring device is normally a mechanical scanning roller to determine fiber sliver thickness. Generally a rotational-speed detector 6 which ascertains the intake speed of the fiber sliver 3 is connected to the measuring device 1. Both measurement signals are transmitted to the measured-value editor 15. The values supplied by the measured-value editor 15 are transmitted to the autolevelling system 13 with a delay produced by the measured-value retarder 14 as a function of the fiber sliver speed. The autolevelling system 13 transmits a signal to the booster 12, said signal being able to trigger an adjustment of the drafting in draw-frame 4 via the booster 12.

It can furthermore be seen that an additional measuring device 2 detects the fiber sliver thickness at the output of the draw-frame 4. This may be a mechanical scanning roller or a measuring device using some other physical measuring principle. In the present example the withdrawal speed of the fiber sliver is determined by the coupling of a rotational-speed measuring device 5 with the scanning roller 2. The two signals at the output are also detected by a measured-value editor 16. The measured-value editor 16 transmits the corresponding signals to the autolevelling system 13. Normally, these signals are detected before the input and after the output of the draw-frame 4 in order to find a correlation in the autolevelling system 13 for the starting point of autolevelling or for autolevelling intensity.

According to the present invention, the measured-value signals are branched off at the input as well as at the output of the draw-frame in parallel paths and are transmitted to the signal analyses 18. These signal analyses work in parallel and independently of the autolevelling system. FIG. 1 shows signal analyses 18 carrying out fiber sliver measurements.

It is a characteristic of the signal analyses 18 that when fiber sliver measurements are carried out, measured-value signals of the fiber sliver thickness of the scanning roller 1 and the incoming speed of the fiber sliver ascertained by the rotational-speed indicator 6 are detected as signals before the input of the draw-frame and the measured-value signals of fiber sliver thickness of the scanning roller 2 and the withdrawal speed of the fiber sliver ascertained by the rotational-speed indicator 5 are detected as signals after the output of the draw-frame 4 and are transmitted to the known autolevelling system as well as to the signal analyses 18 according to the invention. Additional, time-related signal analyses are conducted for each detected measured-value signal. The types of time-related signal analyses are conducted according to expert knowledge, i.e. e.g. differentiation with maxima/minima evaluation over the most widely different time interval (t) or differential ratios (dt) or integration over different periods of time. A computer 17 is used for this. If the computer already present in the autolevelling system has sufficient capacity it can be used, otherwise a separate computer must be installed for this.

Different steps of signal analysis according to FIG. 1 are, for example:

Establishment of a mean value of fiber sliver thickness for different fiber sliver lengths Establishment of the differential ratios over different periods of time for different operating states Spectral analyses, e.g. to recognize different fiber sliver materials.

As shown in FIG. 1, the variations of the signal analyses apply to the measured-value signals coming from measuring device 1 as well as to measured-value signals coming from measuring device 2. The establishment of mean values of fiber thickness is broken down into three parallel analyses.

The difference between the analyses consists in the length of the fiber sliver to be examined depending on the characterization as shorter lengths A1, medium lengths A2 and long lengths A3. The establishment of a mean value represents one analysis step.

The establishment of mean values is also carried out for time states, i.e. operational states such as stoppage, run-up, etc.

The signal analyses conducted by means of time differential ratios recognize signal change speeds in operation as well as during machine stoppage. These signal analyses are also broken down into three parallel analyses:

Differential ratio short time period B1

Differential ratio medium time period B2

Differential ratio long time period B3.

This also represents one analysis step.

Provisions are also made for operational data to be stored separately from stoppage data (data for other operational states are also possible), so that in the course of subsequent searches, the memory contents for a stopped draw-frame can be compared with the start of the draw-frame, for example, and so that possible corrections (according to the expert knowledge contained in the program) of data which are faulty because of long stoppages or temperature influence may be made.

The spectrogram C is another signal analysis which is an autonomous analysis step in the overall design. The spectrogram C analyzes raw material quality and raw material type. It makes it possible to recognize material-specific properties which occur when different fiber sliver materials are used by using spectral line images obtained by means of the analysis. The spectrograms can however also be used for the recognition of periodic disturbances in the fiber sliver in order to cause the machine to stop or to call up special maintenance.

All these signal analyses transmit their updated results (these are characteristic signal magnitudes) to corresponding memory locations S, i.e. the last deposited, present value is received at the appertaining memory location S. The previous value is overwritten in the process. However, the overwriting of the previous value only occurs after comparison between previous value and present value. If the deviation resulting from the comparison is within a tolerance, the deviation is not recognized and the previous value is overwritten. If the deviation resulting from the comparison is however out of tolerance range, this is recognized as a deviation and the present value is not yet received into the memory location. Based on the deviation resulting from the comparison (e.g. in case of mean value) and on its type (positive, negative, spectral), an interrogation (search) of all relevant memory locations S is triggered. In the result, a causal connection between the deviation (error) resulting from the comparison and a possible cause of disturbance is determined by means of the expert knowledge (knowledge memory in computer 17) and is classified. Therefore the knowledge memory stores a functional matrix according to expert knowledge. In case of a corrigible deviation, a correction value is calculated in computer 17 for the duration of the error and is introduced into the autolevelling system 13 so that the correction may be implemented even before establishment of the setting signals for drafting. If the correction fails, the draw-frame 4 is stopped.

Building on this above-described basic structure of the signal analyses in the measuring of fiber slivers, the capacity can be expanded by means of new, appropriate signal analyses. These expansions result from other signals within the machine. Such advantageous expansions in addition to the signals during fiber sliver measuring can be the following, for example:

a) Signals from measurements on the booster and/or b) Signals from measurements on the main motor and/or c) Signals from measurements on operating elements.

It is not claimed that this list is complete. The signal analyses of the situations a) and b) are shown separately and in excerpts in FIGS. 2a and 2b.

Figure 2B:
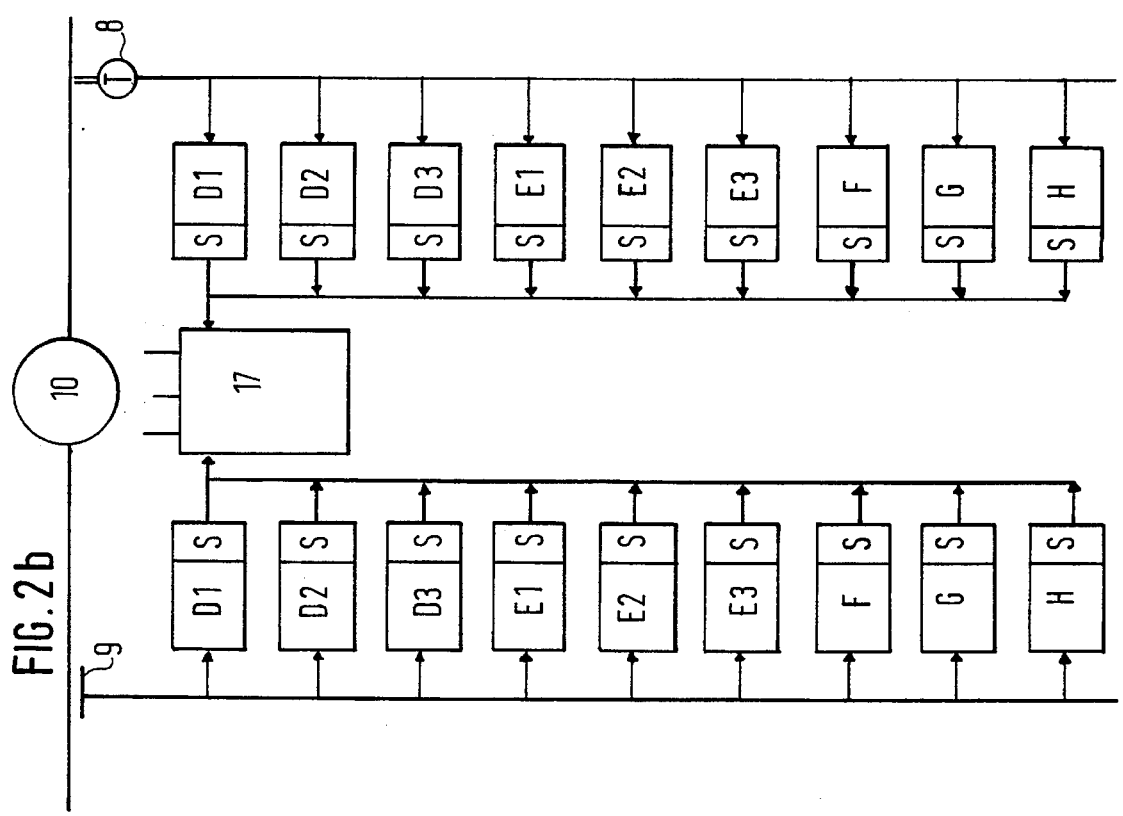
FIG. 2b shows signal analyses on the main motor.
Figure 2A:
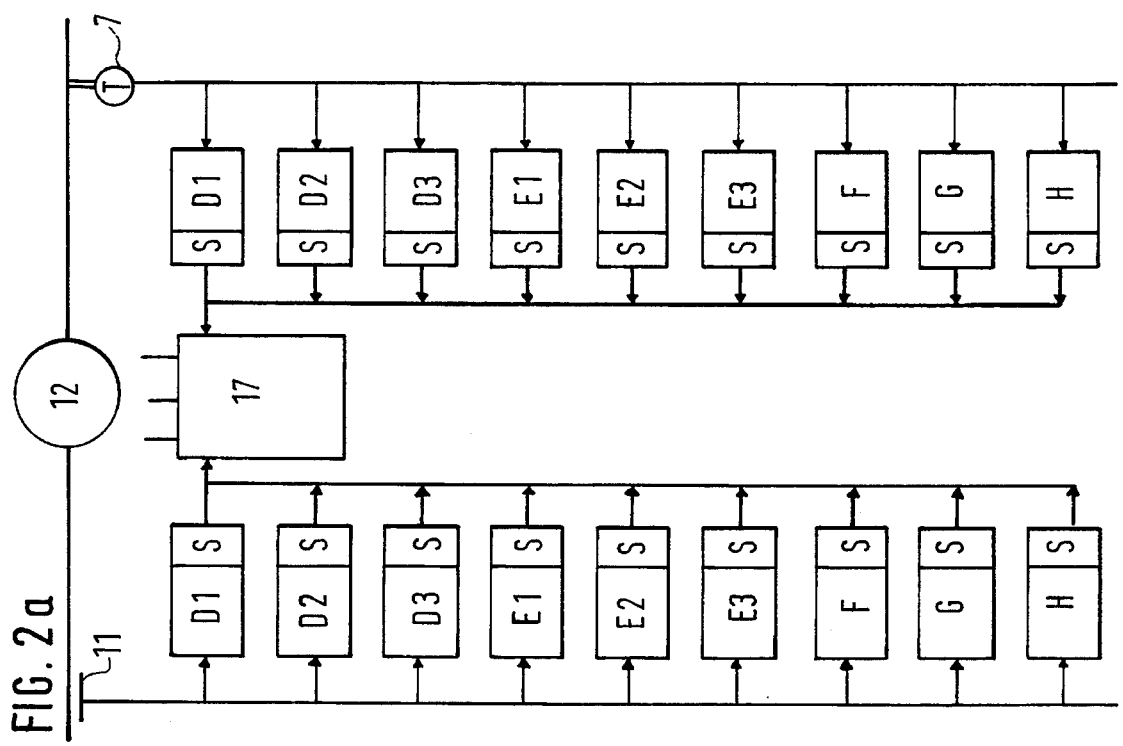
FIG. 2a shows signal analyses on the booster.
Figure 3:
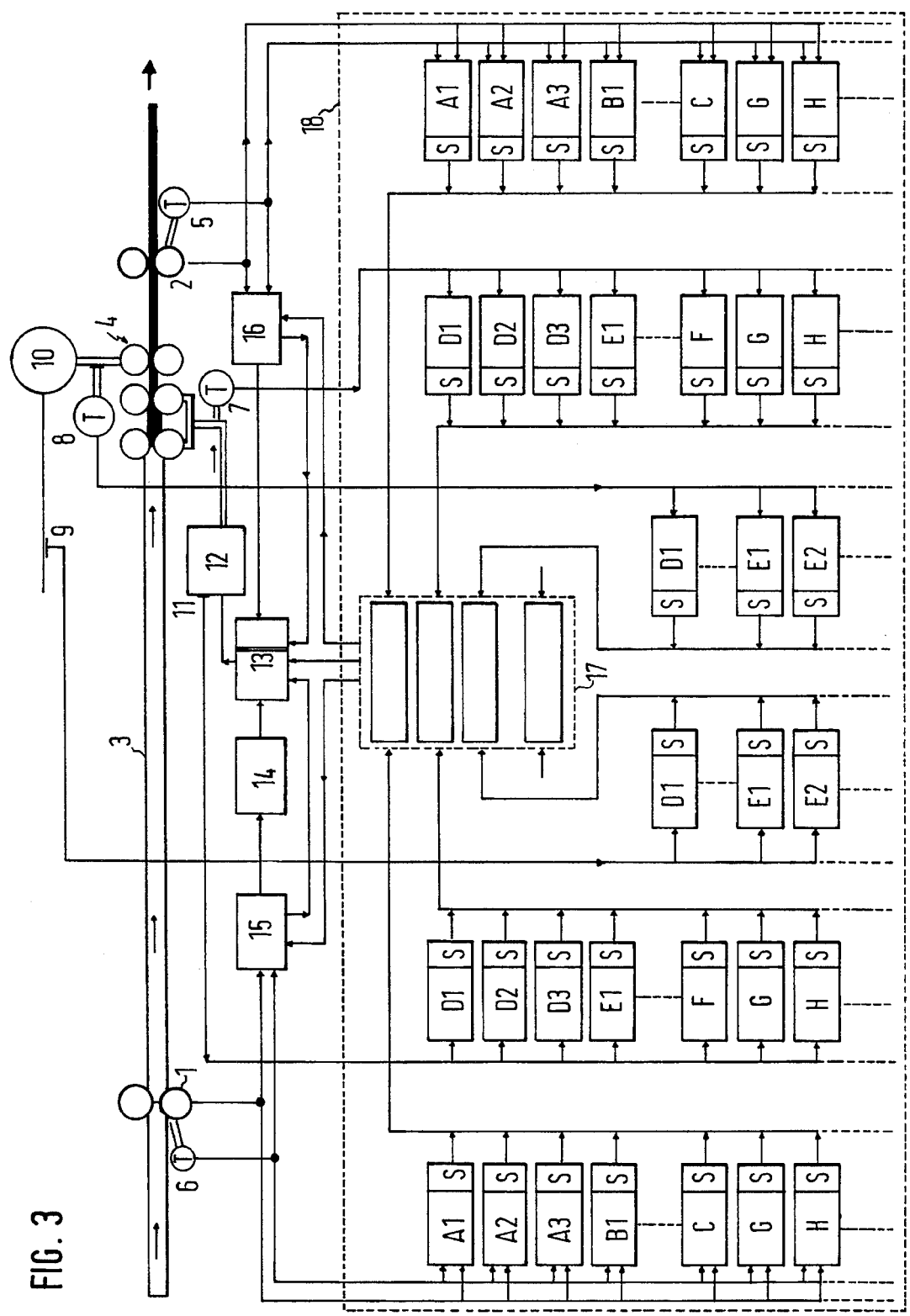
FIG. 3 shows a complex structure of combined signal analyses.

FIG. 2a shows the structural design and the minimum capacity of signal analyses yet to be coupled to the booster 12. At the booster 12 for example, the current in the power supply line is detected as the electrical magnitude and the rotational speed of the rotor shaft as the mechanical magnitude. The detection of the current magnitude is effected by means of the power transformer 11. The rotational speed is detected at the drive shaft by means of rotational-speed indicator 7. The evolution over time (spectrogram) of the current in the energy supply line of the booster 12 correlates with the manipulated variable predetermined by the autolevelling system. If damage to transmission elements occurs on the transmission side, e.g. damage to the bearing ring of a ball bearing or increased dirt accumulation between toothed wheels and toothed belt, this has an effect on the current consumption of the booster 12, but not on the rotational speed (manipulated variable). Based on this fact, a comparison between rotational speed and existing current changes can be made, so that logical consequences with respect to the cause of disturbance can be drawn; these consequences could be the need for maintenance, for example. Signal analyses according to FIGS. 2a and 2b are:

Establishment of mean values short time period D1

Establishment of mean value medium time period D2

Establishment of mean value long time period D3

Differential ratio short time period E1

Differential ratio medium time period E2

Differential ratio long time period E3

Spectrogram F

Statistics G

Events H

The above-named signal analyses are conducted for power values from the power transformers 11 or 9 as well as for the signals from the rotational-speed indicator 7 or 8.

FIG. 2b shows the structural design and the minimum capacity of signal analyses to be coupled to the main motor 10. At the main motor 10 power values are also detected from the energy supply line and the rotational speed values are detected at the rotor shaft and are analyzed. If slip occurs in the transmission, for example, this has an effect on the speed of the delivery roller, but in feedback also on the rotor speed. This in turn influences the power consumption of the main motor 10. Starting at the power transformer 9, the power values are processed in a differentiation step. The magnitude of the rotational speed is determined exactly through the rotational-speed indicator 8, which may be installed on the rotor shaft for example, and is also processed in a differentiation step, for example. A triggered search in combination with the expert knowledge of the computer 17 would have to lead in this case to the result that a maintenance action must be called up.

The counting of events (events H) is another signal analysis in FIGS. 2a and 2b. For example, operational events such as the frequency of actuation of switching devices, e.g. manual or automatic switching on or off of power supply to the draw-frame (autolevelling draw-frame) or power peaks in the signal of the actual power value of the booster 12 in excess of a defined value are counted as events.

The frequency with which a starting key is pressed (event H) in relation to the time and in connection with the mean-value establishment for short length A1 of the fiber sliver can yield the information on whether stoppage of the draw-frame has occurred because of a fiber sliver segment which cannot be drawn because of irregularities (loops, knots, etc.). The search result in this case would be an error message "Loops in the intake".

Another signal analysis consists in the statistical determination of operational and machine data (statistics G). This can be the measurement of the time period during which the machine is switched on, or a measurement of the production time during the time during which the machine is switched on, and on the other hand can also be a statistical evaluation of events in signals.

Based on FIG. 1 and FIGS. 2a, 3b, FIG. 3 schematically shows the totality of signal analyses in measuring fiber slivers, relating to the booster and to the main motor as well as the type of coupling of additional signal analyses. According to FIG. 3 the coupling of additional signal analyses is possible when necessary (represented by connecting paths indicated by broken lines).

The signal analyses in the autolevelling function for a draw-frame comprise in the simplest case signal analyses in fiber sliver measuring, signal analyses at the booster, signal analyses at the main motor. No claim is made that this list is complete, since the number of listed signal analyses depends on the capacity of the required expert knowledge to be installed. The capacity of the expert knowledge is in turn determined by the criteria determining the control of this process.

The effectiveness of the measures initiated on basis of searches increases with the complexity of the capacity of signal analyses and therefore the depth of the search.

It will be apparent to those skilled in the art that various modifications and variations can be made in the present invention without departing from the scope or spirit of the invention. For instance, features illustrated or described as part of one embodiment, can be used on another embodiment to yield a still further embodiment. It is intended that the present invention cover such modifications and variations as come within the scope of the appended claims and their equivalents.

I claim:

1. A process for controlling an autolevelling draw frame as a function of parallel analysis of detected measured-value signals which are used by the draw frame to accomplish autolevelling, said process comprising the steps of:

conducting analyses of the measured-value signals over predetermined periods of time in parallel with and independent of the autolevelling processing of the measured value signals;

generating time dependent signal magnitudes from the analyses of the measured value signals, each time dependent signal magnitude derived from measurements of the respective measured value signals over the predetermined period of time;

saving the signal magnitudes in predetermined memory locations within a computer system;

updating the time related signal magnitudes, and comparing the updated signal magnitudes with the signal magnitudes stored in the corresponding memory locations;

replacing the stored signal magnitudes with the updated signal magnitudes in the corresponding memory location in the event that the updated signal magnitude is within a predetermined tolerance range of the stored signal magnitude; and in the event that the deviation between any updated signal magnitude and stored signal magnitude is not within the tolerance range, interrogating all relevant stored signal magnitudes within said computer system in order to classify the type error causing the deviation.

2. The process as in claim 1, further comprising computing a correction value with the computer system if agreement between the stored and updated signal magnitude is not reached over a predetermined period of time.

3. The process as in claim 2, further comprising applying the correction value to the relevant component of the draw frame to eliminate the error.

4. The process as in claim 1, wherein the computer contains in a memory knowledge of all possible search results and appertaining consequences which could result in the error deviation between the stored and updated signal magnitude.

5. The process as in claim 1, wherein said signal analyses is conducted on at least values measured on the booster and on the main motor of the drawframe during fiber sliver measuring by the drawframe.

6. The process as in claim 1, wherein the measured value signals include the speed of the fiber sliver entering the draw frame, the thickness of the sliver before the draw frame, the speed of the fiber sliver exiting the draw frame, and the thickness of the sliver exiting the draw frame, said signal analyses including:

establishing a mean value pertaining to short length, medium length, and long lengths of fiber sliver both before and after the draw frame;

establishing differential ratios over different periods of time for different operating states of the drawframe;

spectral analysis of the fiber sliver before and after the draw frame; and detection and classification of events occurring with the draw frame.

7. The process as in claim 1, wherein the measured value signals include the actual value of current in the power supply line of the booster, and the rotational speed of the rotor shaft of the booster, said signal analyses including:

establishing mean values of booster current for short, medium, and long periods;

establishing differential ratios of booster current for short, medium, and long periods;

establishing mean values of the rotation speed of the rotor shaft for short, medium, and long periods;

establishing differential ratios of the rotational speed of the booster rotor shaft for short, medium, and long periods;

conducting spectrogram analysis of the fiber material; and statistical analysis of events occurring to the drawframe.

8. The process as in claim 1, wherein the measured signal values include the value of the effective current in the power supply line of the main motor of the draw frame, the rotational speed of the rotor shaft of the main motor, and the switching states of operating elements of the drawframe, said signal analyses including:

establishing mean values of main motor current for short, medium, and long periods;

establishing differential ratios of main motor current for short, medium, and long periods;

establishing mean values of the rotational speed of the main motor shaft for short, medium, and long periods;

establishing differential ratios of the rotational speed of the main motor shaft for short, medium, and long periods;

conducting spectrogram analysis of fiber material;

statistics of operational and machine data; and events on operating elements of the drawframe.

9. A control system for controlling an autolevelling drawframe as a function of analyses conducted on measured signal values from the draw frame, said system comprising a computer system for conducting analysis of a plurality of measured signal values obtained from the drawframe, said computer system further comprising means for conducting analyses of the measured-value signals over predetermined periods of time in parallel with and independent of the autolevelling processing of the measured value signals and for generating time dependent signal magnitudes from the measured value signals over the respective predetermined periods of time, a memory for saving the signal magnitudes in predetermined memory locations within said computer system, means for updating the time related signal magnitudes and comparing the updated signal magnitudes with the signal magnitudes stored in the corresponding memory locations, means for replacing the stored signal magnitudes with the updated signal magnitudes in the corresponding memory location in the event that the updated signal magnitude is within a predetermined tolerance range of the stored signal magnitude, and in the event that the deviation between any updated signal magnitude and stored signal magnitude is not within the tolerance range, means for interrogating all relevant stored signal magnitudes in order to classify the type error causing the deviation.

10. The control system as in claim 9, where said computer system comprises at least an operating portion of the draw frame's control computer.

11. The control system as in claim 9, wherein said computer system comprises an external computer operatively mated with the draw frame's control computer.

12. The control system as in claim 9, wherein said computer system further comprises means for computing a correction value from the deviation between stored and updated signal magnitudes and for applying said correction value to the drawframe to correct the error.

13. The control system as in claim 9, wherein said measured value signals include the speed of the fiber sliver entering the draw frame, the thickness of the sliver before the draw frame, the speed of the fiber sliver exiting the draw frame, and the thickness of the sliver exiting the draw frame, said computer system comprising signal analysis means for:

establishing a mean value pertaining to short length, medium length, and long lengths of fiber sliver both before and after the draw frame;

establishing differential ratios over different periods of time for different operating states of the drawframe;

spectral analysis of the fiber sliver before and after the draw frame; and detection and classification of events occurring with the draw frame.

14. An autolevelling drawframe, said drawframe comprising:

detection devices for measuring certain signal values relating to the operation of the drawframe;

an autoleveller device configured for processing the measured signal values to conduct autolevelling functions;

a control system operating in parallel with and independent from said autolevelling device, said control system comprising a computer system for conducting analysis of a plurality of said measured signal values obtained from the drawframe in parallel with and independent of the autolevelling processing of the measured value signals by said autolevelling device, said computer system generating time dependent signal magnitudes from said respective measured signal values which are derived from measurements of said measured signal values taken over predetermined periods of time, means for saving the signal magnitudes in predetermined memory locations within said computer system, means for updating the time related signal magnitudes and comparing the updated signal magnitudes with the signal magnitudes stored in the corresponding memory locations, means for replacing the stored signal magnitudes with the updated signal magnitudes in the corresponding memory location in the event that the updated signal magnitude is within a predetermined tolerance range of the stored signal magnitude, and in the event that the deviation between any updated signal magnitude and stored signal magnitude is not within the tolerance range, means for interrogating all relevant stored signal magnitudes in order to classify the type error causing the deviation.

15. The draw frame as in claim 14, wherein said computer system further comprises means for computing a correction value from the deviation between stored and updated signal magnitudes and for applying said correction value to said autolevelling processing means to correct the error.

* * * * *